US012602788B2

(12) United States Patent
Wei et al.

(10) Patent No.: US 12,602,788 B2
(45) Date of Patent: Apr. 14, 2026

(54) METHOD AND SYSTEM FOR FULLY AUTOMATICALLY SEGMENTING CEREBRAL CORTEX SURFACE BASED ON GRAPH NETWORK

(71) Applicant: SHANDONG UNIVERSITY, Jinan (CN)

(72) Inventors: Ying Wei, Jinan (CN); Xinyu Liu, Jinan (CN); Zhi Liu, Qingdao (CN); Yankun Cao, Qingdao (CN)

(73) Assignee: SHANDONG UNIVERSITY, Jinan (CN)

( * ) Notice: Subject to any disclaimer, the term of this patent is extended or adjusted under 35 U.S.C. 154(b) by 318 days.

(21) Appl. No.: 18/279,316

(22) PCT Filed: Dec. 29, 2022

(86) PCT No.: PCT/CN2022/143483
§ 371 (c)(1),
(2) Date: Aug. 29, 2023

(87) PCT Pub. No.: WO2024/021523
PCT Pub. Date: Feb. 1, 2024

(65) Prior Publication Data
US 2025/0078279 A1 Mar. 6, 2025

(30) Foreign Application Priority Data
Jul. 27, 2022 (CN) .......................... 202210888076.7

(51) Int. Cl.
*G06T 7/10* (2017.01)
*G06T 7/33* (2017.01)
*G06T 17/20* (2006.01)

(52) U.S. Cl.
CPC ................ *G06T 7/10* (2017.01); *G06T 7/344* (2017.01); *G06T 17/20* (2013.01);
(Continued)

(58) Field of Classification Search
None
See application file for complete search history.

(56) References Cited

U.S. PATENT DOCUMENTS

2013/0322728 A1* 12/2013 Jacobs .................. A61B 5/055
382/132
2020/0311926 A1 10/2020 Tian et al.
2022/0122250 A1* 4/2022 Besson ................ G06N 3/0464

FOREIGN PATENT DOCUMENTS

CN 110909867 A 3/2020
CN 111161226 A * 5/2020 ....... G06F 18/23213
(Continued)

OTHER PUBLICATIONS

Apr. 20, 2023 International Search Report issued in International Patent Application No. PCT/CN2022/143483.
(Continued)

*Primary Examiner* — Amandeep Saini
*Assistant Examiner* — Caroline Tabancay Duffy
(74) *Attorney, Agent, or Firm* — IPRO, PLLC; Na Xu

(57) ABSTRACT

A method and a system for fully automatically segmenting a cerebral cortex surface based on a graph network, the method including: registering a cerebral magnetic resonance image to a standard template space; performing cerebral cortex surface reconstruction on the registered cerebral magnetic resonance image based on a deep neural network; calculating adjacency matrices among the vertexes of the reconstructed cerebral cortex; acquiring corresponding distinguishing features of each grid vertex of the cerebral cortex surface as corresponding feature vectors of the point so as to obtain a cerebral cortex surface segmentation result; and mapping the cerebral cortex surface segmentation result back to the original coordinate space from the standard template space. Graph structure modeling is performed on the reconstructed cerebral cortex surface, and the global
(Continued)

Cerebral cortex surface segmentation (a)

(b)

topological structure features are learned based on the graph network, thus realizing the accurate segmentation of the cerebral cortex surface.

8 Claims, 3 Drawing Sheets

(52) U.S. Cl.
CPC .............. *G06T 2207/10088* (2013.01); *G06T 2207/20081* (2013.01); *G06T 2207/20084* (2013.01); *G06T 2207/30016* (2013.01)

(56) References Cited

FOREIGN PATENT DOCUMENTS

| | | | |
|---|---|---|---|
| CN | 112927357 | A | 6/2021 |
| CN | 113190662 | A | 7/2021 |
| CN | 114581451 | A | 6/2022 |
| CN | 114581628 | A | 6/2022 |
| CN | 114626293 | A | 6/2022 |
| CN | 114972366 | A | 8/2022 |
| WO | 2020/033566 | A1 | 2/2020 |

OTHER PUBLICATIONS

Apr. 20, 2023 Written Opinion issued in International Patent Application No. PCT/CN2022/143483.
Sep. 14, 2022 Office Action issued in Chinese Patent Application No. 202210888076.7.
Songwei Wang et al. "Region Division Method of Brain Slice Image Based on Deep Learning". Journal of Computer Applications, 2020, vol. 40, No. 4, pp. 1202-1208.

\* cited by examiner (a)                              (b)

(a)

Cerebral cortex
surface
segmentation (b)

1

METHOD AND SYSTEM FOR FULLY AUTOMATICALLY SEGMENTING CEREBRAL CORTEX SURFACE BASED ON GRAPH NETWORK

The present disclosure claims priority to Chinese Patent Application 202210888076.7, entitled "METHOD AND SYSTEM FOR FULLY AUTOMATICALLY SEGMENT-ING CEREBRAL CORTEX SURFACE BASED ON GRAPH NETWORK" filed with the China National Intellectual Property Administration on Jul. 27, 2022, which is incorporated herein by reference in its entirety.

TECHNICAL FIELD

The present disclosure belongs to the field of medical image technology and devices, and particularly relates to a method and a system for fully automatically segmenting a cerebral cortex surface based on a graph network.

BACKGROUND

The description in this section merely provides background information related to the present disclosure and does not necessarily constitute the prior art.

Cerebral cortex surface is the most advanced part of the central nervous system, and many studies on neurodegenerative diseases and psychological diseases depend on the analysis study of the cerebral cortex surface.

In clinical medicine, doctors mainly perform diagnostic analysis by magnetic resonance imaging (MRI) on medical images collected and generated by an imaging device. For sequence MRI, experienced brain doctors often need to analyze and judge layer by layer to locate lesions and give corresponding treatment solutions. In order to realize auxiliary diagnosis, MRI-based three-dimensional reconstruction and cortex surface segmentation algorithm have become a hot research topic in recent years.

In existing work, the reconstruction of brain image data is mainly on the basis of a freesurfer software tool set, and includes: performing skull dissection, intensity correction and tissue segmentation for input MRI, and finally forming a reconstructed cerebral cortex surface. A method for segmenting the cerebral cortex surface with the data subjected to three-dimensional reconstruction can be divided into an original space based segmentation method and a sphere surface mapping space based segmentation method.

A complex wrinkle structure of the cerebral cortex surface is homoembryonated in a sphere in the topological structure science, so methods for operating in an original space, such as clustering, standard map registration, learning based voxel segmentation methods, are difficult to well process the wrinkle structure of the cerebral cortex surface. The clustering based method is greatly influenced by clustering parameters, so an unsupervised clustering result is difficult to be approved by clinicians; the segmentation performance of the standard map registration based method is reduced because of large individual difference; and the learning based voxel segmentation method has a partial volume effect of voxels, so the upper limit of segmentation boundary accuracy is low.

The sphere surface mapping space based method is the mainstream method at present. Although it has the advantage of accurate segmentation theoretically, space mapping noise is easily introduced in the mapping process, and a lot of time is cost for mapping to the sphere surface space to finish segmentation and then mapping back to the original space. Existing analysis work shows that this method is difficult to effectively handle a task of segmenting the cerebral cortex surface having a damaged area.

SUMMARY

In order to overcome the shortcomings of the above related art, the present disclosure provides a method for fully automatically segmenting a cerebral cortex surface based on a graph network. According to the method, graph structure modeling is performed on the reconstructed cerebral cortex surface, and global topological structure features are learned based on the graph network, thereby realizing direct accurate segmentation on the cerebral cortex surface in an original brain space.

In order to achieve the above objective, one or more examples of the present disclosure provide the following technical solutions:

In one aspect, the present disclosure provides a method for fully automatically segmenting a cerebral cortex surface based on a graph network, including:

registering a cerebral magnetic resonance image to a standard template space;

performing cerebral cortex surface reconstruction on the registered cerebral magnetic resonance image based on a deep neural network, and acquiring triangular patch grid representations of the cerebral cortex surface;

setting a suitable sampling rate according to the cerebral cortex surface image resolution, and performing down-sampling on cerebral cortex surface grid data;

calculating adjacency matrices in a corresponding convolution process of the graph network;

calculating feature description vectors of vertexes of the cerebral cortex surface, and generating corresponding feature matrices of all vertexes of the cerebral cortex surface;

inputting the adjacency matrices and the feature matrices to a trained graph network model to obtain a cerebral cortex surface segmentation result; and performing post-processing and space mapping on the segmentation result to complete the segmentation of the cerebral cortex surface.

According to a further technical solution, the registering a cerebral magnetic resonance image to a standard template space specifically includes:

specifying the standard template space to be registered, and performing affine and nonlinear registration through an image registration open source library.

According to a further technical solution, the performing cerebral cortex surface reconstruction on the inputted registered cerebral magnetic resonance image based on a deep neural network, and acquiring triangular patch grid representations of the cerebral cortex surface includes:

inputting a registered MRI cerebral image for the adopted network structure, and predicting implicit surface representations of the inner and outer surfaces of the cerebral cortex;

then eliminating topological deformation caused by singular points by means of topological correction to a sphere; and finally, acquiring the triangular patch grid structure data of the reconstructed cerebral cortex surface by a contour surface grid extraction algorithm.

The setting a suitable sampling rate according to the cerebral cortex surface image resolution, and performing down-sampling on cerebral cortex surface grid data includes:

setting a suitable sampling rate mainly according to the resolution of the cerebral cortex surface data, where a suitable set down-sampling rate can reduce the time cost for the algorithm and ensure that the image resolution after up-sampling is within an acceptable range.

According to a further technical solution, the calculating 3 adjacency matrices in a corresponding convolution process of the graph network includes:

calculating a Euclidean distance and a geodesic distance among the cerebral cortex vertexes according to a connection relationship among the cerebral cortex surface grid vertexes after down-sampling and corresponding Euclidean space coordinates of the vertexes, and acquiring corresponding adjacency matrices of three convolution layers in the graph network according to a weight calculation formula and by virtue of three Gaussian kernels initialized by pre-training parameters.

According to a further technical solution, the calculating feature description vectors of vertexes of the cerebral cortex surface, and generating corresponding feature matrices of all vertexes of the cerebral cortex surface includes: calculating an average curvature, a groove depth, a shape index, a curvature and maximum and minimum main curvatures of the cerebral cortex surface; fusing the geometric quantities for describing cortex wrinkle information and Euclidean space position coordinate information to serve as description feature vectors of the vertexes; and combining the corresponding feature vectors of all the vertexes to form cerebral cortex surface feature matrices.

According to a further technical solution, in the step of inputting the adjacency matrices and the feature matrices to a trained graph network model to obtain a cerebral cortex surface segmentation result, a neighborhood combination mode and a message propagation rule f of the graph network are as follows:

$$H^{i+1} = f(H^i, \bar{A}_i) = \sigma(\bar{A}_i H^i W^i)$$

$$O = \text{softmax}(\bar{A}_3 H^3 W^3)$$

$H^i$ represents the weight matrix of an $i^{th}$ layer, a nonlinear activation function $\sigma$ is a Relu function, and (i=1, 2); the graph convolution network includes three convolution layers and a softmax layer; the first layer of input includes a feature matrix $X=H^1$ and an adjacency matrix $\bar{A}_1$, $\bar{A}$ representing an adjacency matrix added with self-loop and normalization operation; the output is a category matrix O of the vertex, and the matrix has the size of N×C, C representing a number of categories in vertex prediction; and $W^i$ is a hidden layer learnable parameter of the graph convolution; and the step includes: determining categories of all vertexes in the template space according to the output category matrix O so as to complete the segmentation of the cerebral cortex surface in the template space.

According to a further technical solution, the performing post-processing and space mapping on the segmentation result to complete the segmentation of the cerebral cortex surface includes: applying a spatial consistency to the cerebral cortex surface segmentation result based on a graph segmentation algorithm, and correcting a possible prediction error of a single singular point; and performing up-sampling on the corrected segmentation result, and mapping the segmentation of the cerebral cortex surface back to an original coordinate space from the standard template space to complete the segmentation of the cerebral cortex surface.

In a second aspect, the present disclosure provides a system for fully automatically segmenting a cerebral cortex surface based on a graph network, including:

a registration module configured to register the cerebral magnetic resonance image to the standard template space;

a cerebral cortex surface reconstruction module configured to perform cerebral cortex surface reconstruction on the registered cerebral magnetic resonance image based on a deep neural network, and acquire triangular patch grid representations of the cerebral cortex surface, and set a suitable sampling rate according to the cerebral cortex surface image resolution, and perform down-sampling on cerebral cortex surface grid data;

a matrix calculation module configured to calculate adjacency matrices in a corresponding convolution process of the graph network, and calculate feature description vectors of vertexes of the cerebral cortex surface, and generate corresponding feature matrices of all vertexes of the cerebral cortex surface;

a segmentation module configured to input the adjacency matrices and the feature matrices to a trained graph network model to obtain a cerebral cortex surface segmentation result; and a mapping module configured to perform post-processing and space mapping on the segmentation result to complete the segmentation of the cerebral cortex surface.

The above one or more technical solutions have the following beneficial effects:

the method according to the present disclosure performs graph structure modeling on the reconstructed cerebral cortex surface, introduces a learnable graph node connection weight construction, and realizes accurate segmentation of the cerebral cortex surface in a graph processing mode.

The present disclosure provides a segmentation method based on the graph convolution network, the connection weights among the sampling vertexes are generated under the control of an introduced learnable Gaussian kernel, and thus accurate segmentation of the cerebral cortex surface in the original space can be directly realized. The problem that in an existing method, it is needed to register to the standard spherical space for segmentation of the cerebral cortex surface, which causes large time cost is solved.

The cerebral cortex surface segmentation work mainly refers to the cortex surface position information and the cortex wrinkle distribution; and the graph convolution network has high learning capability, and can capture topological structure features of the cerebral cortex surface, thus realizing accurate segmentation of the cerebral cortex surface.

Compared with conventional methods such as the freesurfer tool set based reconstruction segmentation method and a deep learning hybrid framework for cerebral cortex segmentation based on neural network segmentation reconstruction through unsupervised clustering or other algorithms, the method for automatically segmenting a cerebral cortex surface based on a graph network according to the present disclosure not only greatly decreases the time cost for image processing, but also improves the accuracy of the whole reconstruction segmentation process.

The additional advantages of the present disclosure will be set forth in part in the description below, parts of which will become apparent from the description below, or will be understood by the practice of the present disclosure.

BRIEF DESCRIPTION OF THE DRAWINGS

The accompanying drawings constituting a part of the present disclosure are used to provide a further understanding of the present disclosure. The exemplary examples of the present disclosure and descriptions thereof are used to explain the present disclosure, and do not constitute an improper limitation of the present disclosure.

DETAILED DESCRIPTION

It is to be noted that, the following detailed descriptions are all exemplary, and are intended to provide further descriptions of the present disclosure. Unless otherwise specified, all technical and scientific terms used herein have the same meanings as those usually understood by a person of ordinary skill in the art to which the present disclosure belongs.

It is noted that the terms used herein are merely used for describing specific implementations, and are not intended to limit exemplary implementations of the present disclosure.

The examples in the present disclosure and features in the examples may be mutually combined in case that no conflict occurs.

Example I

Figure 1:
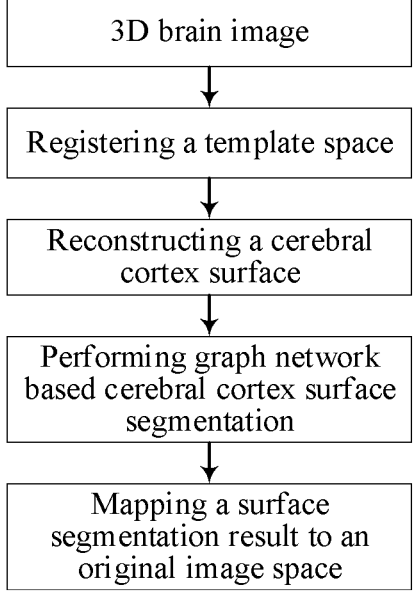
FIG. 1 is a flowchart of an end-to-end cerebral cortex segmentation based on a graph network according to an example of the present disclosure.

As shown in FIG. 1, this example discloses a method for fully automatically segmenting a cerebral cortex surface based on a graph network, including:

registering a cerebral magnetic resonance image to a standard template space, specifically, on the basis of reg_aladin and reg_resample commands in an open source registration tool set niftireg, specifying a 1 mm-precision isotropic standard cerebral graph template and a cerebral magnetic resonance image to be registered, and acquiring the registered magnetic resonance image and a corresponding 4*4 affine transformation matrix;

performing cerebral cortex surface reconstruction on the inputted registered cerebral magnetic resonance image based on a deep neural network;

calculating adjacency matrices among cerebral cortex vertexes according to a connection relationship among grid vertexes of the reconstructed cortex surface and a geodesic distance;

acquiring a corresponding three-dimensional coordinate position of each vertex and distinguishing features such as a main curvature as corresponding feature vectors of the vertex, and combining all the feature vectors as feature matrices of the cerebral cortex surface;

inputting the adjacency matrices and the feature matrices to a trained graph network model to obtain a cerebral cortex surface segmentation result; and mapping the cerebral cortex surface segmentation back to an original coordinate space from the standard template space.

Figure 2:
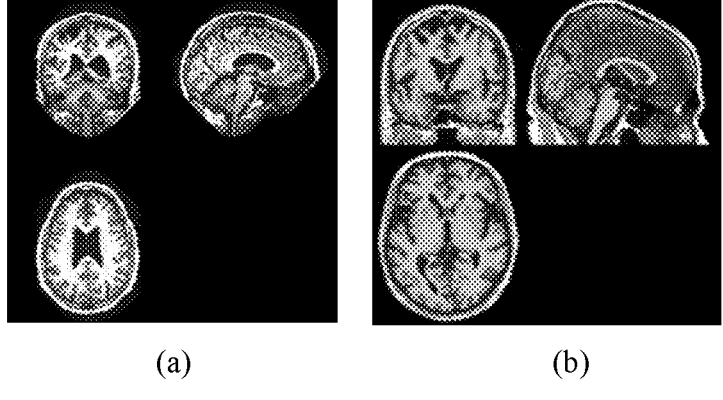
FIG. 2 is a schematic diagram of MRI cerebral image registration.

According to a specific example, as shown in FIG. 2, FIG. 2(a) is an MRI image before registration, and FIG. 2(b) is an MRI image after registration; the cerebral magnetic resonance image is registered to an MNI105 cerebral template space (or other cerebral standard template spaces) through affine transformation; since individual differences exist in human brains, and the same brain structure has different positions, so the coordinates of the image in the space during scanning are also different; it is necessary to eliminate individual differences and unify the coordinates firstly during research, that is, the image is registered to the standard template, thereby facilitating subsequent statistical analysis work. The method includes:

1) firstly giving a cerebral standard template image and a cerebral image to be registered based on an open source registration tool set niftireg, and executing a reg_aladin command to preliminarily obtain an affine transformation matrix (4*4); and 2) giving the affine transformation matrix and the cerebral image to be registered acquired in the previous step, specifying cubic spline interpolation as a linear transformation interpolation mode, and acquiring a registered cerebral magnetic resonance image.

According to a specific example, the performing cerebral cortex surface reconstruction on the inputted registered image based on a deep neural network includes:

specifying a reconstruction prediction resolution, such as 512*512*512, in the standard template space; uniformly dividing the grid space equally according to the preset resolution; predicting implicit surface representations on the grid points by the trained deep neural network, a surface file generated by processing by the network through the freesurfer tool set being taken as a deep learning training data set, and the network input image being a nuclear magnetic resonance image registered to the standard space by a subject; acquiring feature mapping of the image through three-dimensional convolution operation of an encoder network part; performing sampling in the preset equally divided grid space; (acquiring representations for grid reconstruction by sampling points) extracting local and global features of the corresponding sampling points; taking space position coordinates of the sampling points as input of a decoder network; and performing prediction to obtain signed distance function (SDF) representations of the corresponding sampling points, a positive value representing that the sampling points are inside a prediction surface, a negative value representing that the sampling points are outside the prediction surface, an absolute value representing an absolute distance from the prediction surface, and the formed SDF representations of all the sampling points representing being predicted implicit surface representations. Repairing possible prediction defects of the prediction result through a topology correction algorithm specifically includes: mapping the acquired implicit

Figure 3:
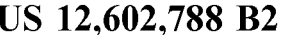
FIG. 3 is a schematic structural diagram of cerebral cortex reconstruction surface grids.
Figure 3:
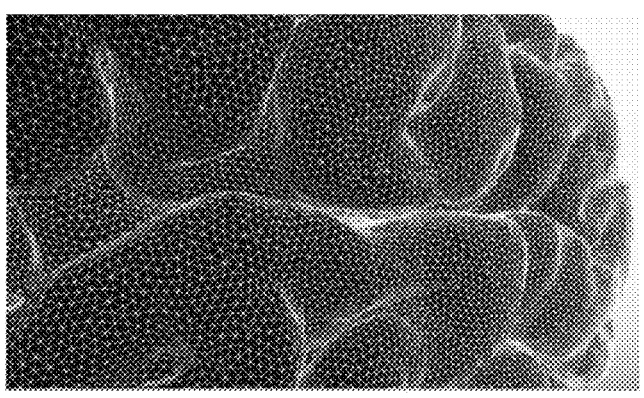

7 surface representations to a sphere space, repairing corresponding topological defects such as holes in the sphere surface, and then extracting a 0 contour surface through a contour surface grid extraction technology, such as a marching cubes algorithm capable of reserving the topological structure, to acquire a corresponding triangular patch grid structure of the reconstructed cerebral cortex surface area. The reconstructed cerebral cortex surface grid structure is shown in FIG. 3.

According to a specific example, the calculating 3 adjacency matrices among the cerebral cortex vertexes for the corresponding convolution process of the graph network according to the connection relationship among the vertexes and the geodesic distance includes: calculating a Euclidean distance d and a geodesic distance ρ among the cerebral cortex vertexes according to the connection relationship among the down-sampled cerebral cortex surface grid vertexes and corresponding Euclidean space coordinates of the vertexes; acquiring the corresponding adjacency matrices $\overline{A}_1,\overline{A}_2,\overline{A}_3$ of the three convolution layers in the graph network according to the weight calculation formula and by virtue of the three Gaussian kernels (corresponding to the three convolution layers, and learnable parameters in network training) initialized by pre-training parameters; and giving coordinates of two vertexes, shown as:

$v_i=(x_i,y_i,z_i)$ and $v_j=(x_j,y_j,z_j)$, the calculation formula of the Euclidean distance $$d_{i,j} = \|v_i - v_j\|_2^2 = \sqrt[2]{(x_i - x_j)^2 + (y_i - y_j)^2 + (z_i - z_j)^2},$$

the geodesic distance ρ is calculated by using a classical Dijkstra algorithm; a relationship vector between any two vertexes $v_i$ and $v_j$ is $u_{i,j}=(d_{i,j},\rho_{i,j})^T$, i≠j; and the calculation of adjacency weight coefficients of two non-overlapped vertexes is generated by inputting the relationship vectors into the Gaussian kernel functions, and the specific calculation formula is as follows:

$$w_{i,j} = \exp\left(-\frac{1}{2}(u-\overline{u}_{i,j})^T \left(\begin{matrix}\sigma_d^2 & \\ & \sigma_\rho^2\end{matrix}\right)^{-1}(u-\overline{u}_{i,j})\right)(i \neq j),$$

an adjacency coefficient between any two vertexes is shown as:

$$a_{i,j} = a_{j,i} = \begin{cases} w_{i,j} & i \neq j \\ 1 & i = j \end{cases}$$

the adjacency matrix $\overline{A}$ can be shown as:

$$\overline{A} = \begin{pmatrix} 1 & a_{1,2} & \dots & a_{1,N} \\ a_{2,1} & 1 & \dots & a_{2,N} \\ \vdots & \vdots & \ddots & \vdots \\ a_{N,1} & a_{N,2} & \dots & 1 \end{pmatrix}$$

and the cerebral cortex surface formed by points and edges is shown as G=(V,E), V representing a set of all the vertexes, and E representing a set corresponding to all the edges; $(x_i, y_i, z_i)$ represents position coordinates of the edge $v_i$ in a three-dimensional template space; and the obtained adjacency matrices are square matrices having a dimension of N*N, N representing the number of the vertexes of the cortex surface.

Figure 4:
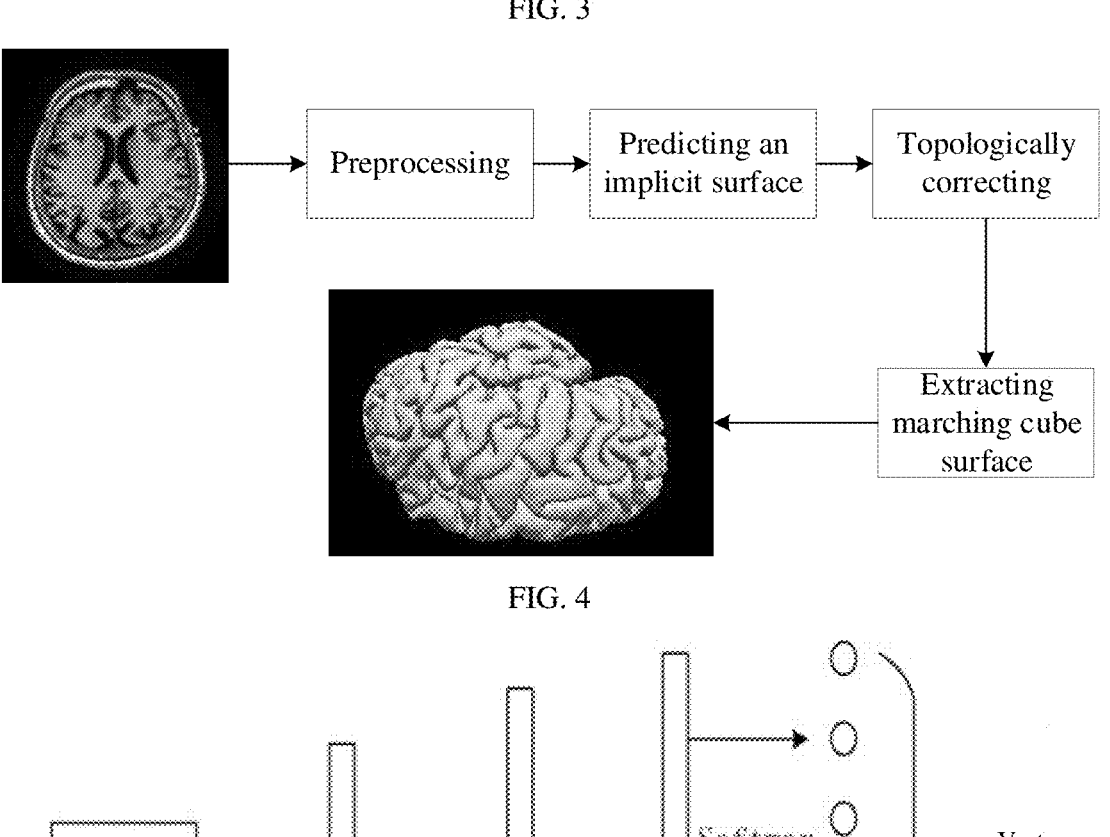
FIG. 4 is a schematic diagram of deep learning based cerebral cortex surface reconstruction.

According to a specific example, the deep learning based cerebral cortex surface reconstruction is shown in FIG. 4; the acquiring a corresponding three-dimensional coordinate position of each vertex and distinguishing features such as a main curvature as corresponding feature vectors of the vertex, and combining all the feature vectors as feature matrices of the cerebral cortex surface includes: calculating an average curvature, a groove depth, a shape index, a curvature and maximum and minimum main curvatures of the cerebral cortex surface, related calculation being realized through a third-party open source tool library (such as VTK); fusing the geometric quantities for describing cortex wrinkle information and Euclidean space position coordinate information $(x_i, y_i)$ to serve as description feature vectors of the vertexes; and combining the corresponding feature vectors to all the vertexes to form a cerebral cortex surface feature matrix X having the size of N*M, N representing a total number of the vertexes, and M representing the length of the feature vectors.

According to a specific example, the inputting the adjacency matrices and the feature matrices to a trained graph network model to obtain a cerebral cortex surface segmentation result includes: specifically adaptively selecting a transfer rule of the graph network used by the system according to a specific task; and for convenient description, a neighborhood combination mode and a message propagation rule f of the graph network used in this example are as follows:

$$H^{i+1} = f(H^i, \overline{A}_i) = \sigma(\overline{A}_i H^i W^i)$$

$$O = \text{softmax}\left(\overline{A}_3 H^3 W^3\right)$$

Figure 5:
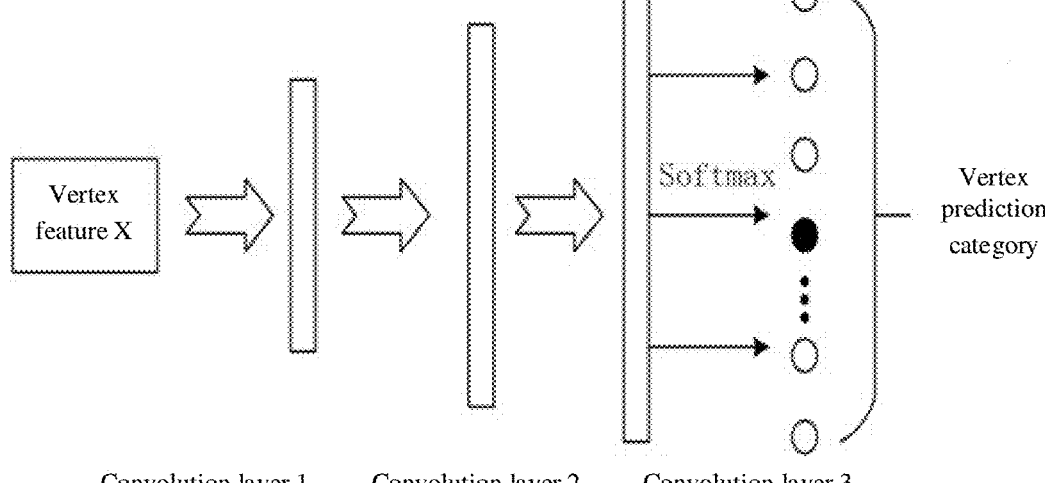
FIG. 5 is a schematic diagram of a graph convolution network framework.

$H^i$ represents the weight matrix of an $i^{th}$ layer, a nonlinear activation function a is a Relu function, and (i=1, 2); the graph convolution network includes three convolution layers and a softmax layer; the first layer of input includes a feature matrix $X=H^1$ and an adjacency matrix $\overline{A}_1$, $\overline{A}$ representing an adjacency matrix added with self-loop and normalization operation; the output is a category matrix O of the vertex, and the matrix has the size of N×C, C representing a number of categories in vertex prediction; and $W^i$ is a hidden layer learnable parameter of the graph convolution; and the step includes: determining categories of all vertexes in the template space according to the output category matrix O so as to complete the segmentation of the cerebral cortex surface in the template space. The schematic diagram of the graph convolution network framework is shown in FIG. 5.

According to a specific example, the mapping the cerebral cortex surface segmentation back to an original coordinate space from the standard template space specifically includes: calculating an inverse matrix of the transformation matrix registered from the original space to the standard template space, and mapping the cerebral cortex surface segmentation result of the template space back to the original brain space.

Specifically, for the inputted brain three-dimensional image data such as nuclear magnetic resonance imaging, firstly, a space transformation matrix is generated based on a position coordinate correspondence between a specified point in the original space and a target space, and then is registered to the standard template space, thereby realizing end-to-end cerebral cortex surface reconstruction based on the deep neural network; the used segmentation network refers to a network structure in a thesis "Cruz R S, Lebrat L, Bourgeat P, et al. Deepcsr: A 3d deep learning approach for cortical surface reconstruction[C]//Proceedings of the IEEE/ CVF Winter Conference on Applications of Computer Vision. 2021: 806-815.", and the network structure diagram is as shown in FIG. 5; for the image registered to the template brain space, the implicit surface representations of the points in a continuous coordinate system are predicted based on the trained deep neural network, so that a local volume effect in voxel-based segmentation reconstruction is avoided; and the cortex surface (triangular patch grids) is extracted through topology correction and a contour surface grid extraction algorithm (marching cubes algorithm).

Experienced cranial nerve doctors perform brain region segmentation labeling on the generated cerebral cortex grid data through freesurfer software as label data for graph network segmentation training, and select a corresponding segmentation protocol to determine the number of segmentation categories, and then train the graph network. Because the connection relationship of all vertexes is constructed, the graph network may cover the global distribution information; and compared with a conventional method directly based on rules, this method has better segmentation performance.

The graph neural network training data are generated by processing through a freesurfer V6.0 tool set, and the process specifically includes: performing skull dissection, intensity non-homogeneous correction, tissue segmentation and cerebral cortex surface reconstruction on the inputted original MRI image through a freesurfer command, and manually segmenting left and right half brains into 36 regions respectively based on a freesurfer desikan segmentation protocol to serve as segmentation training labels (ground-truth); and other segmentation standards are also suitable for the network framework according to the present disclosure.

Modeling the cerebral cortex surface data of the triangular grid structure into a graph specifically includes: performing down-sampling, such as 4×down-sampling, on original grid data within an acceptable cerebral cortex surface data resolution range, so as to facilitate a computer device to perform training and prediction based on the whole graph, thereby reducing the time for an algorithm. An adjacency matrix describing a connection weight relationship among the vertexes is constructed, the adjacency matrix constructs a connection weight between any two vertexes, and common methods for determining each value of the adjacency matrix in the graph network include a Pearson-based related method, a k-Nearest Neighbor (KNN) rule method and a distance-based method. Because of the wrinkle structure of the cerebral cortex surface, the geodesic distances of two vertexes, with close Euclidean distances, of the vertexes on the cerebral cortex surface area with large curvature may be not necessary close, the two distance measurements are fused to generate the weights among different vertexes according to the technical solution of the present disclosure, and the $u_{i,j}=(d_{i,j}, \rho_{i,j})^T$ vector is inputted into the learnable Gaussian kernel function to acquire the weights of the edges connecting the two points. It is to be noted that the graph convolution network according to the present disclosure is formed by three convolution layers and a softmax layer; the three convolution layers correspond to three learnable Gaussian kernel functions respectively; and the three randomly initialized Gaussian kernel functions and the corresponding weight matrix $W_i$ in the training process adopt values obtained through uniform sampling. In the first convolution layer, the input feature vector of the node is expanded to 16 dimensions; in the second convolution layer, the dimension of the hidden layer node vector is expanded to 25 dimensions from 16 dimensions; in the third convolution layer, the dimension is further expanded to 36 dimensions, so as to correspond to the number of categories predicted by the node; and finally, after softmax processing, the position corresponding to the maximum value of the feature vector of the vertex serves as a predicted value. Cross entropy loss is used as a loss function for network training, and the learning rate is set to be $1e×10^{-4}$.

When segmentation is performed based on a trained graph network model, a DeepCSR deep learning network is used in a cerebral cortex surface reconstruction method, and the method includes: firstly, registering an MRI image to an MNI105 space; then, predicting implicit surface representations of the cerebral cortex surface based on the DeepCSR network instead of voxel based segmentation, a prediction network including an encoder network and a decoder network; forming an 1*n input vector through three-dimensional coordinates of space sampling points in combination with local features and global features in the encoder network; transmitting to the decoder network for decoding outputting, the implicit surface representations being represented by the signed distance function (SDF), S={sdf(p)=l, $p \in R^3$, $l \in R$}, p being the coordinates of a three-dimensional space point, and l being an equivalent surface 0; and then, eliminating topological defects such as holes or handles by a method of topological correction into a sphere, then taking 8 adjacent points to form a cube by the marching cubes algorithm, and constructing zero equivalence in the cube to complete the reconstruction of the cerebral cortex surface.

4×down-sampling is performed on the cerebral cortex surface grid data, and the down-sampling is realized based on a python trimesh grid data processing library; then adjacency matrices corresponding to three convolutional layers are constructed based on the above steps, and three Gaussian kernel functions are used in the operation respectively; and in network prediction overcharge, the pre-trained Gaussian kernel function parameters and the weight matrix parameters are imported into the network, and three times of convolution and one time of softmax processing are carried out to acquire classification labels of the corresponding vertexes. In the learnable inter-vertex weight calculation process, the Euclidean distance d between two points and the geodesic distance ρ are considered at the same time; because of the complex wrinkle distribution of the cerebral cortex, the region with a large surface curvature is difficult to describe singly only by means of the Euclidean distance and the geodesic distance; and an adjacency matrix construction mode based on fusion of the two distances is not described in existing cerebral cortex surface segmentation work.

Figure 6:
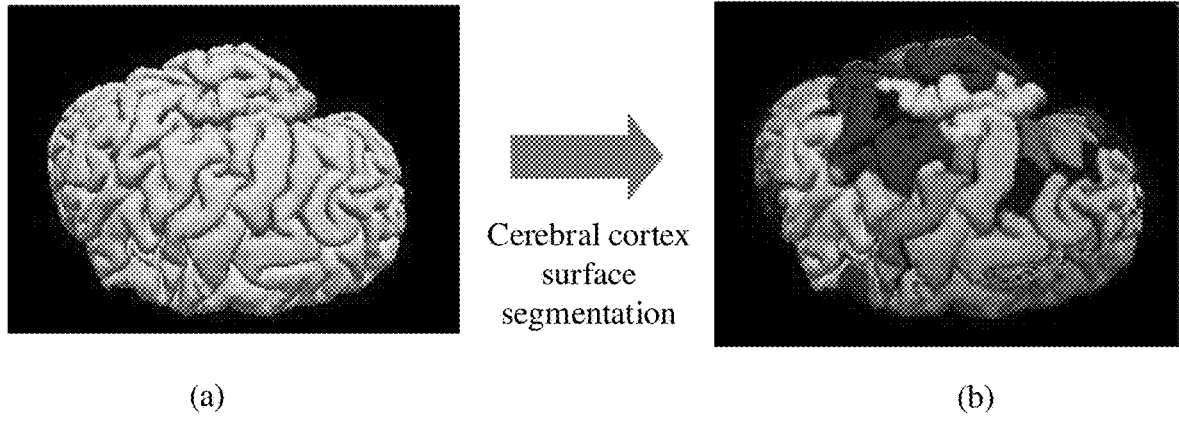
FIG. 6 shows a cerebral cortex surface segmentation based on cerebral cortex surface reconstruction, (a) shows cerebral cortex surface reconstruction data, and (b) shows a graph network based cerebral cortex surface segmentation result.

After all vertex classification tasks are finished, prediction results need to be post-processed; according to example, a spatial consistency is applied to the cerebral cortex surface segmentation result based on the graph segmentation algorithm, and a possible prediction error of a single singular point is corrected; S×up-sampling is performed on the corrected segmentation results; cerebral cortex surface segmentation is mapped back to the original coordinate space from the standard template space; and thus the cerebral cortex surface segmentation work is finished, as shown in FIG. 6.

Example II

An objective of this example is to provide a computer apparatus, including a memory, a processor, and a computer program is stored on the memory and runnable on the processor; and the processor executes the steps of the above method when executing the program.

Example III

An objective of this example is to provide a computer readable storage medium.

The computer program is stored on the computer readable storage medium, and the program executes the steps of the above method when being executed by the processor.

Example IV

An objective of this example is to provide a system for fully automatically segmenting a cerebral cortex surface based on a graph network, including:

a registration module configured to register the cerebral magnetic resonance image to the standard template space;

a cerebral cortex surface reconstruction module configured to perform cerebral cortex surface reconstruction on the registered cerebral magnetic resonance image based on a deep neural network, and acquire triangular patch grid representations of the cerebral cortex surface, and set a suitable sampling rate according to the cerebral cortex surface image resolution, and perform down-sampling on cerebral cortex surface grid data;

a matrix calculation module configured to calculate adjacency matrices in a corresponding convolution process of the graph network, and calculate feature description vectors of vertexes of the cerebral cortex surface, and generate corresponding feature matrices of all vertexes of the cerebral cortex surface;

a segmentation module configured to input the adjacency matrices and the feature matrices to a trained graph network model to obtain a cerebral cortex surface segmentation result; and a mapping module configured to perform post-processing and space mapping on the segmentation result to complete the segmentation of the cerebral cortex surface.

The steps involved in the apparatuses according to the Examples II, III and IV above correspond to the method Example I. The specific implementation can be found in the relevant description of Example I. The term "computer readable storage medium" is to be understood as a single medium or multiple media including one or more instruction sets; it is also to be understood as including any medium capable of storing, encoding, or carrying instruction sets for execution by the processor and causing the processor to execute any method of the present disclosure.

Those skilled in the art are to be understand that the various modules or steps of the present disclosure may be implemented using a universal computer apparatus, and alternatively, they can be implemented using program code that can be executed by a computing apparatus. Therefore, they can be stored in a storage apparatus for execution by the computing apparatus, or they can be separately made into various integrated circuit modules; alternatively, multiple modules or steps within them can be made into a single integrated circuit module for implementation. The present disclosure is not limited to any specific combination of hardware and software.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

What is claimed is:

1. A method for fully automatically segmenting a cerebral cortex surface based on a graph network, comprising:

registering a cerebral magnetic resonance image to a standard template space;

performing cerebral cortex surface reconstruction on the registered cerebral magnetic resonance image based on a deep neural network, and acquiring triangular patch grid representations of the cerebral cortex surface;

performing a 4× down-sampling on cerebral cortex surface grid data;

calculating adjacency matrices in a corresponding convolution process of the graph network;

calculating feature description vectors of vertexes of the cerebral cortex surface, and generating corresponding feature matrices of all vertexes of the cerebral cortex surface;

inputting the adjacency matrices and the feature matrices to a trained graph network model to obtain a cerebral cortex surface segmentation result; and performing post-processing and space mapping on the segmentation result to complete the segmentation of the cerebral cortex surface, wherein the calculating adjacency matrices in a corresponding convolution process of the graph network comprises:

calculating a Euclidean distance and a geodesic distance among the cerebral cortex vertexes according to a connection relationship among the cerebral cortex surface grid vertexes after down-sampling and corresponding Euclidean space coordinates of the vertexes, and acquiring corresponding adjacency matrices of three convolution layers in the graph network according to a weight calculation formula and by virtue of three Gaussian kernels initialized by pre-training parameters, and specifically, the calculating 3 adjacency matrices among the cerebral cortex vertexes for the corresponding convolution process of the graph network according to the connection relationship among the vertexes and the geodesic distance comprises: calculating a Euclidean distance d and a geodesic distance ρ among the cerebral cortex vertexes according to the connection relationship among the down-sampled cerebral cortex surface grid vertexes and corresponding Euclidean space coordinates of the vertexes; acquiring the corresponding adjacency matrices $\overline{A}_1$, $\overline{A}_2$, $\overline{A}_3$ of the three convolution layers in the graph network according to a weight calculation formula and by virtue of the three Gaussian kernels initialized by pre-training parameters; and giving coordinates of two vertexes, shown as:

$v_i = (x_i, y_i, z_i)$ and $v_j = (x_j, y_j, z_j)$, the calculation formula of the Euclidean distance $d_{i,j}$ being:

$$d_{i,j} = \|v_i - v_j\|_2^2 = \sqrt[2]{(x_i - x_j)^2 + (y_i - y_j)^2 + (z_i - z_j)^2},$$

wherein the geodesic distance ρ is calculated by using a classical Dijkstra algorithm; a relationship vector between any two vertexes $v_i$ and $v_j$ is $u_{i,j} = (d_{i,j}, \rho_{i,j})^T$, i≠j;

and the calculation of adjacency weight coefficients of two non-overlapped vertexes is generated by inputting the relationship vectors into the Gaussian kernel functions, and the specific calculation formula is as follows:

$$w_{i,j} = \exp\left(-\frac{1}{2}(u - \overline{u}_{i,j})^T \begin{pmatrix} \sigma_d^2 & \\ & \sigma_\rho^2 \end{pmatrix}^{-1} (u - \overline{u}_{i,j})\right)$$

and i≠j, an adjacency coefficient between any two vertexes is shown as:

$$a_{i,j} = a_{j,i} = \begin{cases} w_{i,j} & i \neq j \\ 1 & i = j \end{cases};$$

the adjacency matrix $\tilde{A}$ can be shown as:

$$\overline{A} = \begin{pmatrix} 1 & a_{1,2} & \dots & a_{1,N} \\ a_{2,1} & 1 & \dots & a_{2,N} \\ \vdots & \vdots & \ddots & \vdots \\ a_{N,1} & a_{N,2} & \dots & 1 \end{pmatrix};$$

and the cerebral cortex surface formed by points and edges is shown as G=(V, E), V representing a set of all the vertexes, and E representing a set corresponding to all the edges; $(x_i, y_i, z_i)$ represents position coordinates of the edge v; in a three-dimensional template space; and the obtained adjacency matrices are square matrices having a dimension of N*N, N representing the number of the vertexes of the cortex surface.

2. The method for fully automatically segmenting a cerebral cortex surface based on a graph network according to claim 1, wherein the registering a cerebral magnetic resonance image to a standard template space specifically comprises:

specifying the standard template space to be registered, and performing affine and nonlinear registration through an image registration open source library.

3. The method for fully automatically segmenting a cerebral cortex surface based on a graph network according to claim 1, wherein the performing cerebral cortex surface reconstruction on the inputted registered cerebral magnetic resonance image based on a deep neural network, and acquiring triangular patch grid representations of the cerebral cortex surface comprises:

inputting a registered MRI cerebral image for the adopted network structure, and predicting implicit surface representations of the inner and outer surfaces of the cerebral cortex;

then eliminating topological deformation caused by singular points by means of topological correction to a sphere; and finally, acquiring the triangular patch grid structure data of the reconstructed cerebral cortex surface by a contour surface grid extraction algorithm.

4. The method for fully automatically segmenting a cerebral cortex surface based on a graph network according to claim 1, wherein the calculating feature description vectors of vertexes of the cerebral cortex surface, and generating corresponding feature matrices of all vertexes of the cerebral cortex surface comprises: calculating an average curvature, a groove depth, a shape index, a curvature and maximum and minimum main curvatures of the cerebral cortex surface; fusing the geometric quantities for describing cortex wrinkle information and Euclidean space position coordinate information to serve as description feature vectors of the vertexes; and combining the corresponding feature vectors of all the vertexes to form cerebral cortex surface feature matrices.

5. The method for fully automatically segmenting a cerebral cortex surface based on a graph network according to claim 1, wherein in the step of inputting the adjacency matrices and the feature matrices to a trained graph network model to obtain a cerebral cortex surface segmentation result, a neighborhood combination mode and a message propagation rule f of the graph network are as follows:

$$H^{i+1} = f(H^i, \overline{A}_i) = \sigma(\overline{A}_i H^i W^i);$$

$$O = \text{softmax} \left(\overline{A}_3 H^3 W^3\right);$$

wherein, $H^i$ represents the weight matrix of an $i^{th}$ layer, a nonlinear activation function o is a Relu function, and i=1, 2; the graph convolution network comprises three convolution layers and a softmax layer; the first layer of input comprises a feature matrix $X = H^1$ and an adjacency matrix $\overline{A}_1$, $\overline{A}$ representing an adjacency matrix added with self-loop and normalization operation; the output is a category matrix O of the vertex, and the matrix has the size of N×C, C representing a number of categories in vertex prediction; and $W^i$ is a hidden layer learnable parameter of the graph convolution; and the step includes: determining categories of all vertexes in the template space according to the output category matrix O so as to complete the segmentation of the cerebral cortex surface in the template space.

6. The method for fully automatically segmenting a cerebral cortex surface based on a graph network according to claim 1, wherein the performing post-processing and space mapping on the segmentation result to complete the segmentation of the cerebral cortex surface comprises:

applying a spatial consistency to the cerebral cortex surface segmentation result based on a graph segmentation algorithm, and correcting a possible prediction error of a single singular point; and performing up-sampling on the corrected segmentation result, and mapping the segmentation of the cerebral cortex surface back to an original coordinate space from the standard template space to complete the segmentation of the cerebral cortex surface.

7. A computer apparatus, comprising a memory, a processor, and a computer program stored on the memory and runnable on the processor, wherein the processor executes the steps of the method according to claim 1 when executing the program.

8. A non-transitory computer-readable storage medium with a computer program stored thereon, wherein the program executes the steps of the method according to claim 1 when being executed by the processor.

* * * * *